United States Patent [19]
Deng et al.

[11] Patent Number: 6,008,589
[45] Date of Patent: Dec. 28, 1999

[54] SINGLE-SWITCH, HIGH POWER FACTOR, AC-TO-AC POWER CONVERTERS

[75] Inventors: Edward E. Deng, Niskayuna, N.Y.; Slobodan Cuk, Laguna Hills, Calif.

[73] Assignee: California Institute of Technology, Pasadena, Calif.

[21] Appl. No.: 08/611,990

[22] Filed: Mar. 5, 1996

[51] Int. Cl.$^6$ .................................................. H05B 37/02
[52] U.S. Cl. ...................... 315/209 R; 315/205; 315/219; 315/291; 315/247; 363/24; 363/34; 363/37; 363/39
[58] Field of Search ................................. 315/307, 247, 315/219, 205, 209 R, 291; 363/34, 37, 39, 40, 44, 47, 48, 24, 25, 26

[56] References Cited

U.S. PATENT DOCUMENTS

| | | | |
|---|---|---|---|
| 3,919,656 | 11/1975 | Sokal et al. | 350/51 |
| 4,184,197 | 1/1980 | Cuk et al. | 363/16 |
| 4,547,705 | 10/1985 | Hirayama et al. | 315/219 |
| 4,564,897 | 1/1986 | Okamoto et al. | 363/132 |
| 4,647,817 | 3/1987 | Fahnrich et al. | 315/104 |
| 4,959,764 | 9/1990 | Bassett | 363/16 |
| 5,021,716 | 6/1991 | Lesea | 315/219 |
| 5,057,749 | 10/1991 | Nilssen | 315/247 |
| 5,122,712 | 6/1992 | Hirschmann | 315/106 |
| 5,223,767 | 6/1993 | Kulka | 315/209 |
| 5,416,387 | 5/1995 | Cuk et al. | 315/209 R |
| 5,510,974 | 4/1996 | Gu et al. | 363/134 |

OTHER PUBLICATIONS

Lutteke et al., "High Voltage High Frequency Class–E Converter Suitable for Miniaturization," IEEE Power Electronics Specialists Conference, 1984, pp. 54–61.

Lutteke et al., "220V Mains 500 kHz Class–E Converter Using a Bimos," IEEE Power Electronics Specialists Conference, 1985, pp. 127–135.

Hiramatsu et al., "Low THD Electronic Ballast with a New AC–DC Converter Operation," Illuminating Engineering Society of North America, Aug. 1992.

Malesani et al., "High Efficiency Electronic Lamp Ballast With Unity Power Factor," IEEE Industry Applications Society (IAS) Annual Conference, 1992, pp. 681–688.

Ismail et al., "A New Class of Low Cost Three–Phase High Quality Rectifiers with Zero–Voltage Switching," IEEE Applied Power Electronics Conference and Exposition, Conference Proceedings, 1993, pp. 182–189.

Matsuo et al., "A New Combined Voltage–Resonant Inverter with High Power Factor and Low Distortion Factor," IEEE Power Electronics Specialist Conference, 1994, pp. 331–335.

Spiazzi et al., "High–Quality Rectifier Based on Coupled–Inductor Sepic Topology," IEEE Power Electronics Specialist Conference, 1994, pp. 336–341.

*Primary Examiner*—Robert Pascal
*Assistant Examiner*—Arnold Kinkead
*Attorney, Agent, or Firm*—A. M. Fernandez

[57] ABSTRACT

A single-switch ac-to-ac converters for driving ac loads which are particularly suitable for gas discharge lamp ballast applications based upon integration of automatic current shapers and converters that resemble a class-E converter, both parts sharing a single active switch. The first part comprises a high power factor (HPF) converter having automatic input current-shaping means and internal energy storage means operated by the single active switch driven at a constant frequency and duty ratio, and the second part comprises a resonant converter means operated by the aforesaid single active switch as it is being driven. Integration of the HPF converter having automatic current shaping means and the resonant converter through the single active switch operation brings advantages from both parts into the whole circuit, such as soft-switching characteristics so that the combined circuit can shape the input current without switching losses in a compact structure.

11 Claims, 11 Drawing Sheets

SINGLE-SWITCH, HIGH POWER FACTOR, AC-TO-AC POWER CONVERTERS

FIELD OF THE INVENTION

The invention pertains to single switch, high power factor switching converters for transforming low frequency ac power from a utility line into high frequency ac power, and in particular to such single-switch converters for a high power factor lamp ballasts.

BACKGROUND OF THE INVENTION

A high frequency lamp ballast is essentially a single-phase ac-to-ac converter, which draws the low frequency power from the utility grid and converts it into a high frequency ac power to feed the lamp. As lighting equipments represent a significant portion of the total load at many installations, maintaining a high power factor is becoming more and more important for the lamp ballasts.

High input power factor is required to reduce the rms line current and its total harmonic distortions so that the utility power line can be more efficiently utilized and less polluted. As a consequence, a current-shaping or power factor correction stage has to be added at the input to conventional ballasts. That makes a typical high power factor lamp ballast consist of two cascaded processing stages. The first stage is designed to be a high power factor rectifier (effectively an ac-to-dc converter), and the second stage is then designed to be a high frequency switching dc-to-ac converter to provide the requisite high frequency ballast function. Both passive and active means can be used in the implementation of the input stage to shape the input current, but because the ballast then consists of two stages in cascade the ballast operates with reduced efficiency and suffers from increased size and weight, thus doubling the cost and reduced reliability.

The resonant matching network for a fluorescent lamp has the following twofold function. It will provide the lamp with the desirable low crest factor sinewave current and presents current source characteristics which provide high enough voltage to strike the lamp during ignition, and it will also stabilize its running current after the lamp strikes as required owing to the fluorescent lamps negative impedance characteristic.

To implement a ballast topology, a "squarewave" switching converter is preferred as disclosed in U.S. Pat. No. 5,416,387 recently granted to the present inventors, because it results in simple control and small component count, with several reactive components to form a resonant matching network that shapes the high frequency ac waveform and provides the high output impedance required by the lamp. The resonant matching network also provides the sinusoidal lamp current with a low crest factor of 1.4.

Figure 1A:
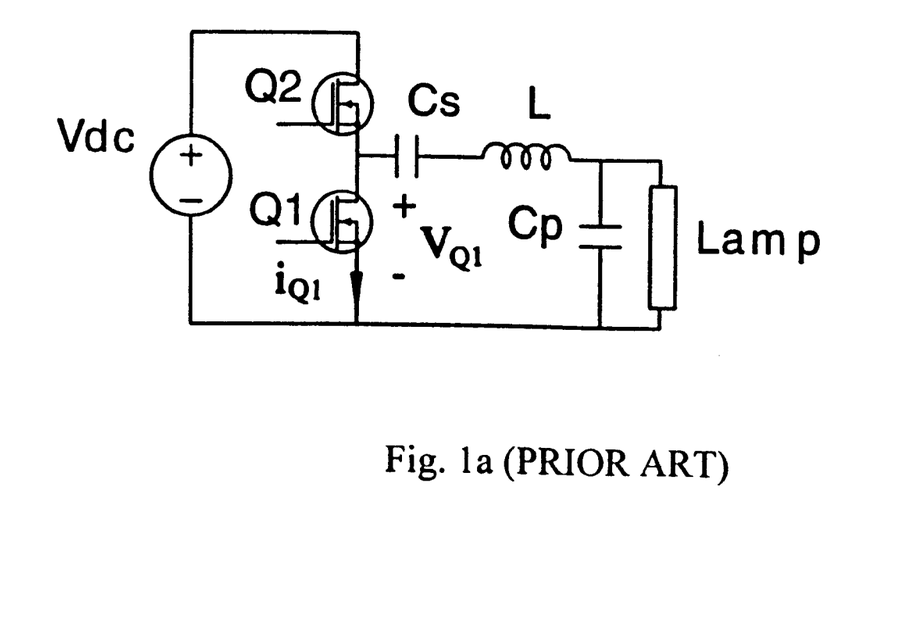
FIG. 1a illustrates a prior-art halfbridge converter for a lamp ballast comprising two active switches and an LCC resonant matching network comprising an inductor L, series capacitor Cs and a shunting capacitor Cp.
Figure 1B:
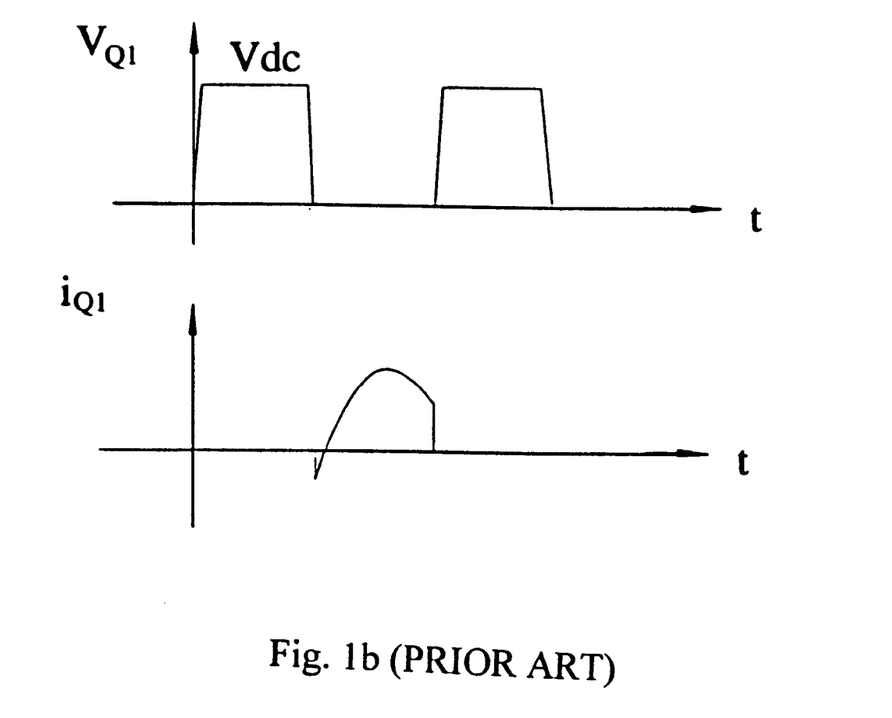
FIG. 1b illustrates voltage and current waveforms of the active switch

Two basic squarewave topologies for ballasts are halfbridge and pushpull resonant converters. The halfbridge topology shown in FIG. 1a comprises MOSFET power transistors Q1 and Q2 that are switched ON alternately to provide a squarewave voltage across a resonant matching network, which comprises and inductor L and capacitors Cs and Cp. That LCC network properly designed is the most popular resonant matching network when the halfbridge topology is used. The voltage and current waveforms of the switching devices are squarewave and sinusoidal, respectively, as shown in FIG. 1b. Hence the LCC ballast experiences a relatively low voltage stress and a high current stress.

Since the resonant matching network provides a stable operating point for the lamp, the ballast can be driven in a simple open-loop manner. As noted above with reference to FIG. 1a, the most popular resonant matching network is an LCC network where a series capacitor Cs of the LCC network is provided to block the dc component of the input pulsing voltage, while an inductor L together with a shunting capacitor Cp and the series capacitor Cs form a series-parallel resonant circuit which provides a current source output at or near its parallel-resonant frequency. If the input voltage to the resonant matching network does not contain any dc component, then a simple L, Cp parallel resonant network can be used.

Figure 2A:
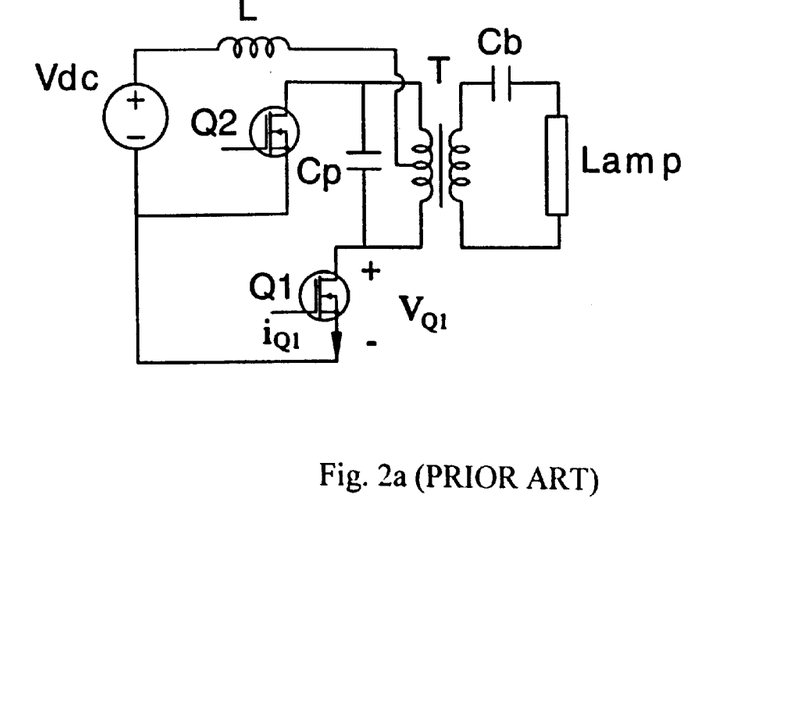
FIG. 2a illustrates a prior-art pushpull converter for a lamp ballast comprising two active switches driving opposite ends of the primary winding of a transformer and a resonant matching network comprising an inductor L, shunting capacitor Cp and series capacitor Cb.
Figure 2B:
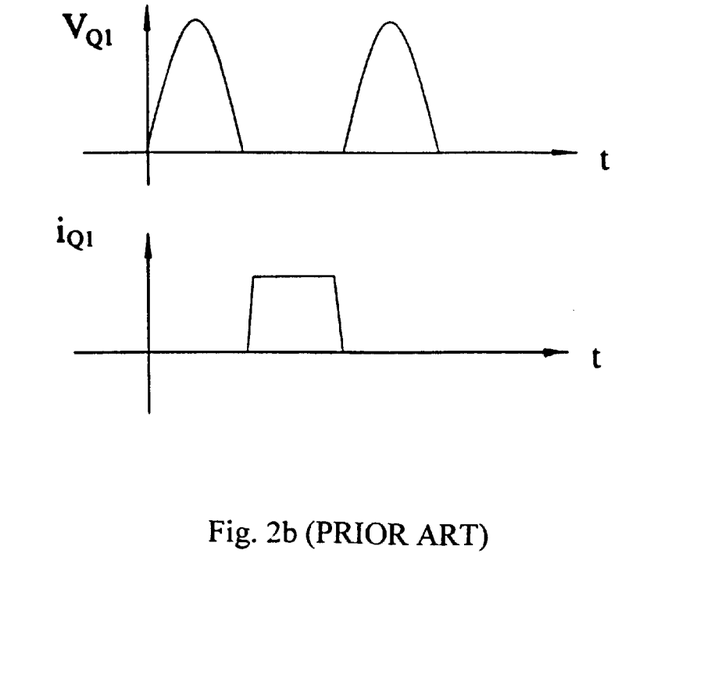
FIG. 2b illustrates voltage and current waveforms of the active switches.

The pushpull topology is essentially the dual form of the halfbridge converter, where a dc current is chopped alternately by two active switches Q1 and Q2 configured in the pushpull manner shown in FIG. 2a. A center tapped transformer T is necessary to provide ac power with a voltage stepup. Usually a resonant capacitor Cp is placed across the transformer primary to shape the waveform, and a capacitor Cb is placed in series with the lamp to limit the lamp current. As opposed to the ballast of FIG. 1a, current through the switch Q1 is basically dc while voltage across the switch is a rectified sinewave whose peak value is at least n times the input voltage Vdc as shown in FIG. 2b.

A lamp ballast based on a class-E tuned power amplifier using a MOSFET switch and an LCC resonator (referred to hereinafter as a class-E converter) was introduced in the prior art by G. Lutteke, II and C. Raets in papers titled "High Voltage High Frequency Class-E Converter Suitable for Miniaturization," IEEE Power Electronics Specialists Conference, 1984, pp. 54–61 and "220V Mains 500 kHz Class-E Converter Using a Bimos," IEEE Power Electronics Specialists Conference, 1985, pp. 127–135. They allow for high efficiency switching at high frequencies for use in a lamp ballast owing to zero switching losses.

Figure 3:
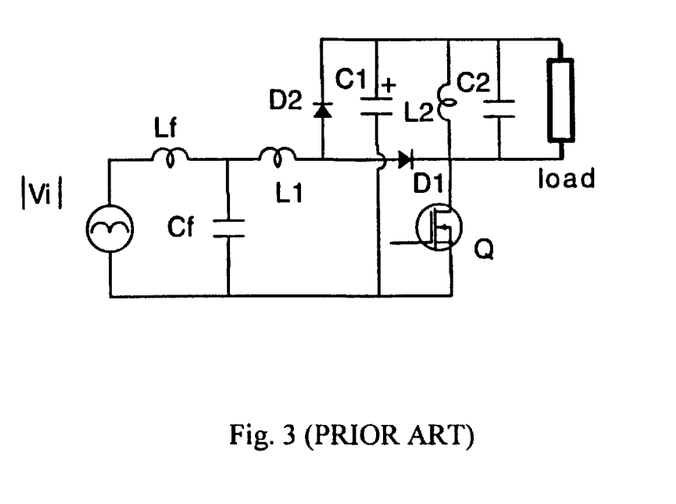
FIG. 3 illustrates a prior-art single-switch high power factor lamp ballast which combines a boost converter having an automatic current shaping function and a class-E converter.

In order to satisfy the need for high performance and low cost, a family of single stage high power factor converters, disclosed by A. Hiramatsu, K. Yamada, F. Ohamoto and M. Mitani in a paper titled "Low THD Electronic Ballast with a new AC-DC-converter operation," presented at an August, 1992 conference of the Illuminating Society of North America, combine a power factor correction boost converter and a half-bridge converter. A single-ended type single-switch converter was also disclosed based on the combination of a boost converter and a class-E converter as shown in FIG. 3. However, the boost converter has a voltage conversion ratio larger than 1. When it is operated in the discontinuous inductor current mode (DICM), its output voltage has to be at least twice the peak input (line) voltage so as to maintain a power factor close to unity, which imposes an unreasonably high voltage stress on the single active switching device when the class-E converter operation is also taken into account. A practical implementation of another single switch circuit is presented in a paper by L. Malesani, L. Rosseto, G. Siazzi and P. Tenti, "High Efficiency Electronic Lamp Ballast With Unity Power Factor," IEEE Industry Applications Society (IAS) Annual Conference, 1992, pp. 681–688. It proposes to reduce voltage stress at the cost of losing zero-voltage switching.

Figure 4:
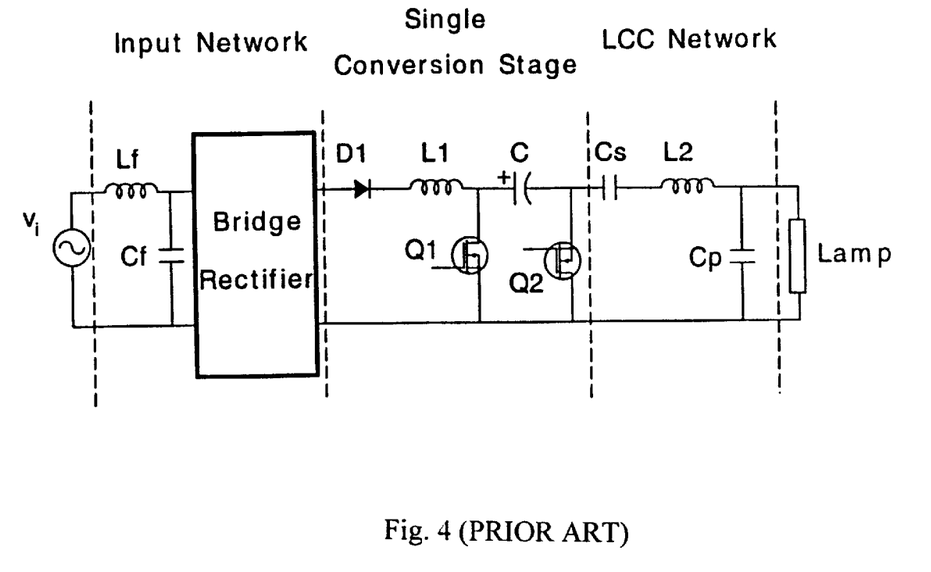
FIG. 4 illustrates a prior-art single-stage, dual-switch high power factor lamp ballast based on the Ćuk converter.

FIG. 4 illustrates a single-stage, dual-switch, high power factor lamp ballast disclosed in U.S. Pat. No. 5,416,387. Owing to a diode D1, it operates in the discontinuous inductor current mode (DICM). That diode decouples the automatic input current-shaping function from the high frequency output lamp ballasting function. The lamp ballast thus based on the Ćuk converter first disclosed in U.S. Pat. No. 4,184,197 is similar to but has advantages over the prior art discussed above, such as high power factor and automatic current shaping as well as naturally provided soft switching. However, it requires two active switches Q1 and Q2, thus adding some complexity to the circuit.

SUMMARY OF THE INVENTION

A primary object of the present invention is to provide single-switch, high power factor ac-to-ac power converters which provides ac loads, particularly gas discharge lamps, with sinewave current, thus having low crest factor and ensuring both long lamp life and low radiated EMI.

Yet another object of the present invention is to provide single-switch, high power factor gas discharge lamp ballasts with negligible line frequency modulation at the high frequency lamp current, further reducing lamp current crest factor.

Yet another object of the present invention is to provide single-switch, high power factor gas discharge lamp ballasts having inductances of the input part combined into a single magnetic core so that, by applying an appropriate ripple steering technique, switching ripple on the input can be effectively eliminated without input EMI filter resulting in a smaller overall size.

Another object is to provide single-switch high power factor gas discharge lamp ballasts having an extra feature of zero voltage switching (ZVS) for reducing switching losses and noise.

These and other objects of the invention are achieved by new single-switch ac-to-ac converters for driving ac loads which are particularly suitable for gas discharge lamp ballast applications based upon integration of automatic current shapers and converters that resemble a class-E converter, both parts sharing a single active switch. The first part comprises a high power factor (HPF) converter having automatic input current-shaping means and internal energy storage means operated by the single active switch driven at a constant frequency and duty ratio, and the second part comprises a resonant converter means operated by the aforesaid single active switch as it is being driven. Integration of the HPF converter having automatic current shaping means and the resonant converter through the single active switch operation brings advantages from both parts into the whole circuit, such as soft-switching characteristics so that the combined circuit can shape the input current without switching losses in a compact structure.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 5b illustrates major switching waveforms of the circuit in FIG. 5a.

DESCRIPTION OF PREFERRED EMBODIMENTS

It is recognized that more lamp ballast circuits can be obtained by proper integration of automatic current shapers and resonant converters. The front-end automatic current shapers provide the input current shaping and internal energy storage, and the resonant converters offer a high frequency current source to drive the lamp. There are two advantages for automatic current shapers to be used in ballast applications. First, automatic current shaping is achieved when the active switch of the input converter operates at a constant switching frequency and duty ratio without generating any extra line ripple when combined with an output resonant converter. Second, the power level for a lamp ballast is usually below 100 W, which is within the range where automatic current shapers are applied without incurring large switch stresses. Proper integration of the automatic current shaper and resonant converter can bring advantages from both sides into the combined circuit. For example, a single-stage high power factor ballast is a converter having an automatic current shaping function and a resonant LCC matching network. By driving the LCC matching network above resonance, soft-switching characteristics can be achieved so that the combined circuit will shape the input current without switching loss.

Most automatic current shapers consist of a single active switch. Proper integration of single-switch automatic current shapers and single-switch converters, such as the class-E converter or forward converter, will provide new single-switch, ac-to-ac converters which are suitable for high frequency load applications, such as for lamp ballasting applications. New circuits having an input part which resembles in function various automatic current-shaping circuits and an output part which resembles in function a class-E or other single switch converter are suitable for high (near unity) power factor lamp ballasts that have a soft-switching feature and the additional advantage of compact structure will now be described.

Prior to presenting the new single-switch high power factor ac-to-ac converters, the principle of operation of a class-E converter and its soft-switching region will be introduced, followed by the principle of operation of automatic current shapers.

Class-E Converter

Figure 5A:
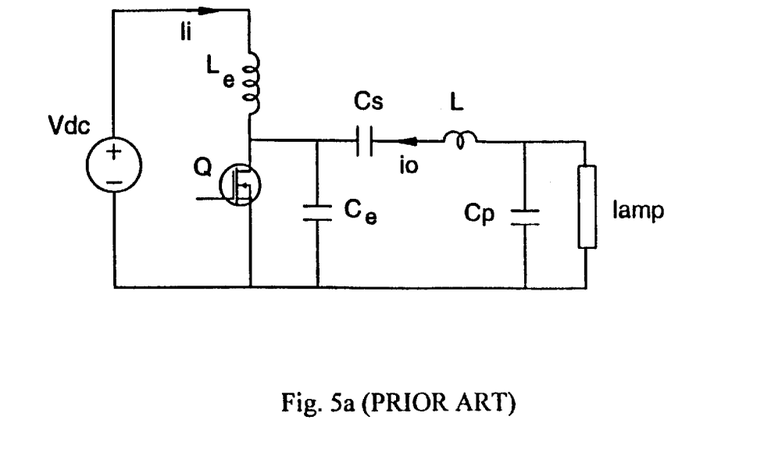
FIG. 5a illustrates a class-E switching power amplifier combined with an LCC matching network for ballasting a gas discharge lamp.
Figure 5B:
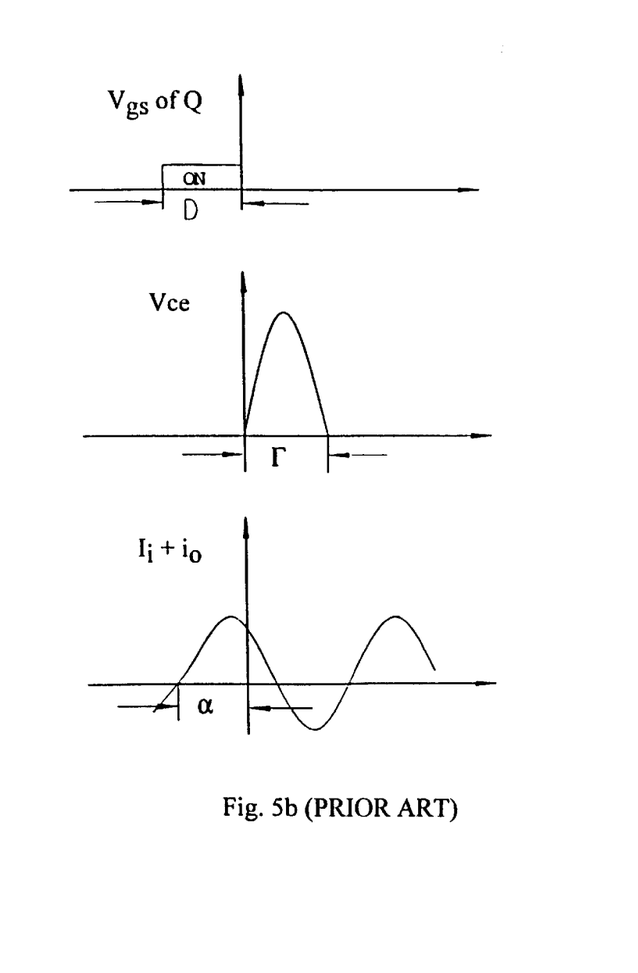

The class-E converter is a high efficiency tuned single-ended switching power amplifier which can be used as a ballast when combined with a resonant matching network (LCC) as shown in FIG. 5a. The dc voltage input connects a current bidirectional switch Q through a feed choke LE. A resonant capacitor CE across the switch Q is also across an LCC resonant matching network comprising a dc blocking capacitor Cs in series with an inductor L and a capacitor Cp connected across a gas discharge lamp. Thus, the basic class-E based ballast has a single switch configuration. The switch waveforms change in a resonant fashion so that in its ideal operating mode there are no switching losses. FIG. 5b shows the major switching waveforms of the circuit. When switch Q turns OFF, capacitor CE delays the switch voltage vCE rise and thus reduces the overlap between the switch voltage and current. Therefore, switch turn-OFF loss is virtually eliminated. The switching voltage vCE eventually rises to a peak, but the resonant matching network is designed so that vCE falls back to zero before the switch Q turns ON, so there is no switch turn-ON loss either. Because of this "lossless switching" operation, this basic class-E based ballast is suitable for high frequency applications where switching loss would otherwise be a major obstacle to its widespread commercial use.

Automatic Current Shapers

Some dc-to-dc converter topologies, when operated in DICM in their ac-to-ac applications, yield a unity or near unity power factor without intelligent control, i.e., the average input current is proportional to the input voltage even when the control (switching frequency and duty ratio) is held constant. In this sense, they are also called "automatic current shapers."

Automatic current shapers can be divided into two categories according to how closely the input current follows the input voltage. The input current quality of one kind of automatic current shapers depends on the voltage conversion ratio $M=V_O/V_i$, like a boost converter. High power factor is obtained at the price of high voltage conversion ratio, so they are also called "nonideal" current shapers. Another kind of current shapers always has unity power factor, no matter what the voltage conversion ratio is, like a buckboost or flyback shaper.

Figure 6:
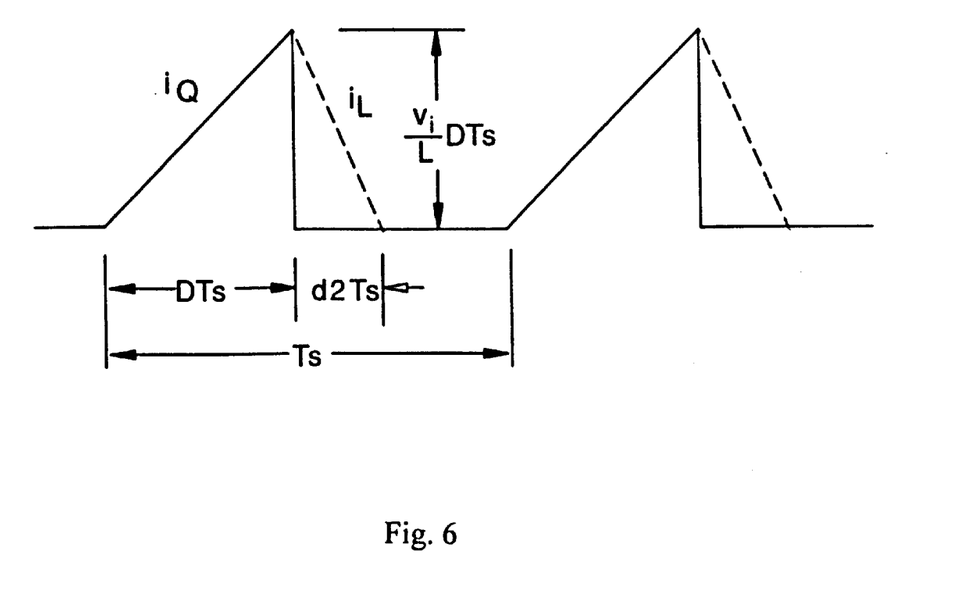
FIG. 6 illustrates the inductor current of a buckboost current shaping converter during a single switching period in a discontinuous inductor current mode (DICM).

The buckboost current-shaping converter inductor current $i_L$ during a single switching period in DICM are shown in FIG. 6. The input current $i_i$ is the average of the rising slope of the inductor current $i_L$, that is:

$$i_i = \frac{D^2 T_s}{2L} v_i \qquad (1)$$

is therefore exactly proportional to $v_i$. Physically, the peak value of inductor current $i_L$ during a single switching cycle is modulated by the instantaneous input voltage, so the area under the rising slope of $i_L$ is proportional to the input voltage. In a buckboost converter, input current is the average of the entire $i_L$ which consists of both parts. Since the $D_2T_S$ interval is not fixed (also modulated by $v_i$), the input current <$i_i$> does not exactly follow the input voltage. Since a buckboost or flyback converter has a discontinuous input current, a lowpass filter has to be placed in front to remove the switching ripple and extract the average value.

Figure 7:
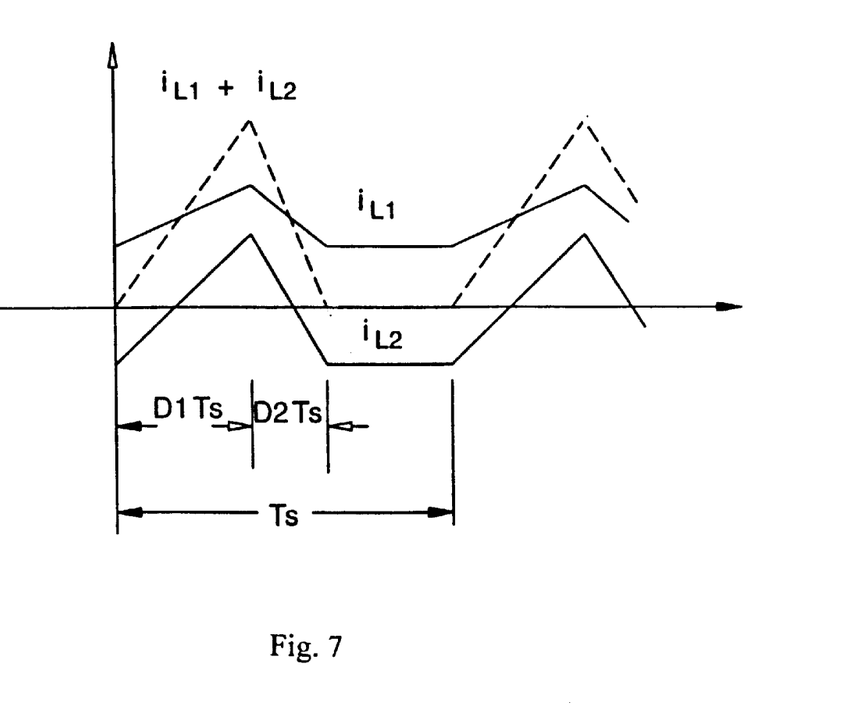
FIG. 7 illustrates the inductor current of the prior-art Ćuk current shaping converter illustrated in FIG. 4.

Another category of current shapers, which include input and output inductors, have continuous input current even when operated in DICM. This is because the DICM operation is defined in terms of the sum of two inductor currents and the inductor with smaller value will carry more switching ripple. Thus, by choosing a large inductor at the input side, input current will be continuous even without extra filtering. In addition, the two inductors can be coupled in such a way that all of the switching ripple is steered away from the input side to the output side and no extra filtering is needed. The Ćuk converter of U.S. Pat. No. 4,184,197 belongs to this category. To illustrate the above situation, the Ćuk current-shaping converter and its inductor currents $i_{L1}$ and $i_{L2}$ during a single switching period in DICM are shown in FIG. 7. It is shown in that patent that input current is:

$$i_i = \frac{D^2 T_s}{2L_e} v_i \qquad (2)$$

where $$L_e = L_1 / L_2$$

Thus, at the price of having two inductors, it is an ideal current shaper. A two-inductor current shaper is not more complicated than a single-inductor current shaper since in practice a single-inductor shaper always needs extra filtering, so the same number of reactive components are needed in either case.

The automatic current shapers introduced above operate based on the fact that the peak value of inductor current $i_L$ during a single switching period is proportional to the instantaneous input voltage $v_i$. The inductor current waveform during a switching period is triangular so it is straightforward to yield the proportional or near proportional relationship between the input voltage and input current. More generally, the automatic current-shaping concept can be extended to a broader category when the peak value of inductor current $i_L$ follows or nearly follows the input voltage even if the inductor current waveform is more complicated. Accordingly, the coupled-inductance technique can also be applied to any two inductors in a converter as long as they share a proportional voltage.

Figure 8A:
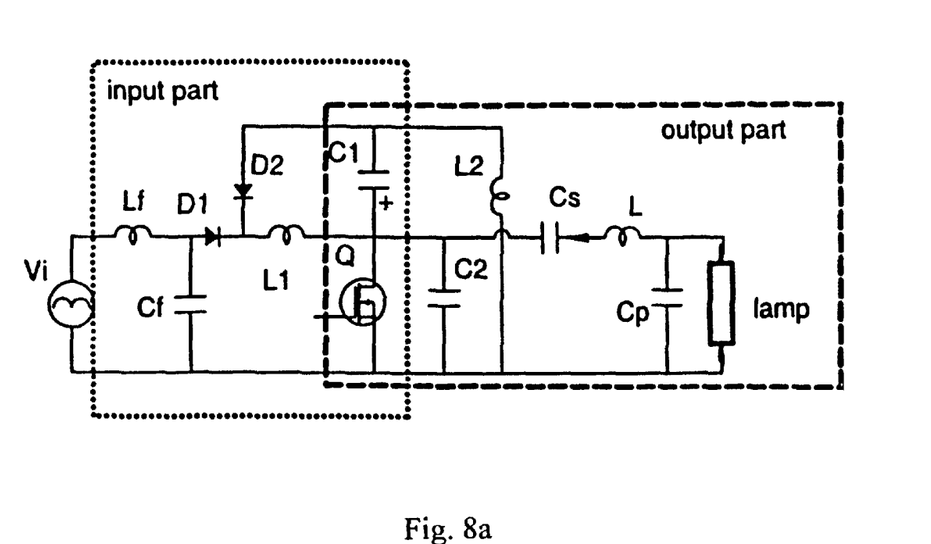
FIGS. 8a through 8h illustrate new circuits that combine current shaping converters in a first part and class-E converters in a second part that obviate the high voltage stress problems of the prior art.

New single switch, ac-to-ac converter topologies derived by proper combination of automatic current shapers and the class-E converter will now be described, but first it should be noted that the single-switch ballast shown in FIG. 3 is itself a combination of (1) boost converter with automatic current shaping capability when operated in the discontinuous inductor current mode (DICM), and (2) a class-E converter in which the boost converter has a voltage conversion ratio larger than 1. When it is operated in DICM, the boost converter output voltage has to be at least two times higher than the peak input (line) voltage in order to maintain a power factor close to unity, which may impose an unreasonably high voltage stress on the single switching device Q when the class-E converter operation is also taken into account. New circuits that obviate this stress problem can be derived by judiciously combining other automatic current shapers with the class-E converter, such as shown in FIG. 8a, which is a proper combination of a buckboost automatic current shaper and a class-E converter. The new ballast physically consists of two overlapping parts, an input part and an output part. The input part comprises an input network and the switch Q in an automatic current shaping configuration, and the output part comprises a class-E power conversion stage and resonant matching network. Another part (not shown) consists of a controller for operating the single switch at a constant frequency and at a fixed duty ratio of about 50%.

The input network of Lf, Cf and a bridge rectifier, not shown but implied in the drawing, provides a rectified sinewave voltage and simultaneously averages and unfolds the input inductor current i1 to yield the bidirectional sinewave line current. The power conversion stage includes fast recovery diodes D1 and D2, input inductor L1, active switch Q, and on energy storage and transfer capacitor C1. The output part comprises a resonant capacitor C2, an inductor L2 and an LCC matching network. The conversion stage converts the rectified line voltage from the input network to the high frequency pulsed, half sinewave, voltage, which is in turn converted by the resonant matching network of L, Cs and Cp into the necessary sinewave current source to drive the lamp. Functionally, L1, Q, C1, D1, D2 and input filter of Lf and Cf constitute the input part of the circuit which resembles a buckboost converter, and C1, Q, C2, L2 and the LCC matching network form an output part of the circuit which resembles a class-E converter.

It is well known that a DICM buckboost converter functions as an ideal resistor emulator when its active switch is operated at a constant switching frequency and duty ratio, i.e., unity power factor is automatically obtained despite its output voltage Vc1 as long as the input inductor current i1 is operated in DICM mode. Hence the voltage stress for the single switching device Q may be considerably lower in the new circuit of FIG. 8a. Zero-voltage turn ON and OFF characteristics of the class-E converter are retained by utilizing the resonance between capacitor C2 and the LCC resonance matching network (CsLCp) so that the switching losses at high frequency operation are eliminated. Energy transfer capacitor C1 provides the necessary internal energy storage so that lamp current contains negligible line frequency modulation.

Figure 8B:
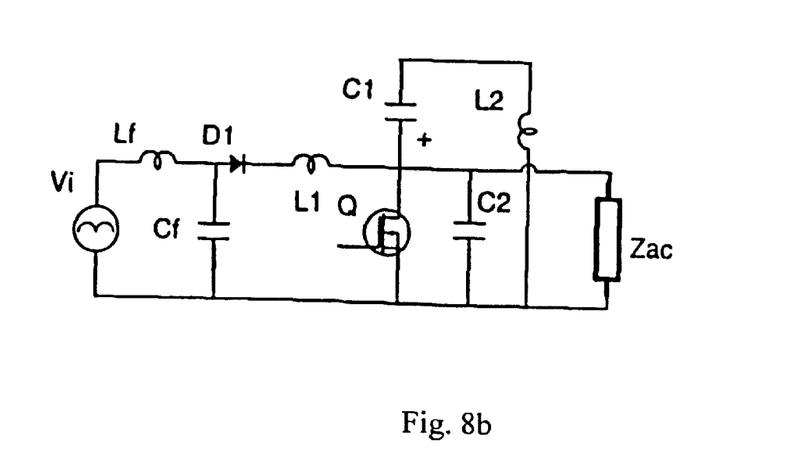

Although the circuit of FIG. 8a is shown with an LCC resonant matching network and a gas discharge lamp as an ac load, it should be noted that this embodiment as well as all other embodiments of the present invention may be implemented with any ac load equivalent to such an LCC circuit and lamp shown in FIG. 8b where such an equivalent ac load is indicated by the reference Zac. This convention for representing such an equivalent load Zac will be followed in the circuit diagrams of other embodiments described below except the pushpull embodiment of FIG. 8c.

Another new circuit shown in FIG. 8b which is in the same class is derived by disconnecting the diode D2 in the circuit of FIG. 8a. The current shaping function in this circuit is performed by the "nonideal DICM boost operation" in the sense that when the switch Q is OFF, input inductor L1 is connected completely to the approximate half sinewave voltage source vc2 as opposed to the stiff dc voltage source Vc1 as in the "ideal" boost converter, This automatic current shaper, which resembles a circuit known as a SEPIC converter but with the fast diode D1 added, is a good automatic current shaper even if the input current cannot be easily derived as a function of input voltage, as described in a paper by E. Ismail and R. Erickson, "A New Class of Low Cost Three-Phase High Quality Rectifiers with Zero-Voltage Switching," IEEE Applied Power Electronics Conference and Exposition, Conference Proceedings 1993, pp. 182–189.

Figure 8C:
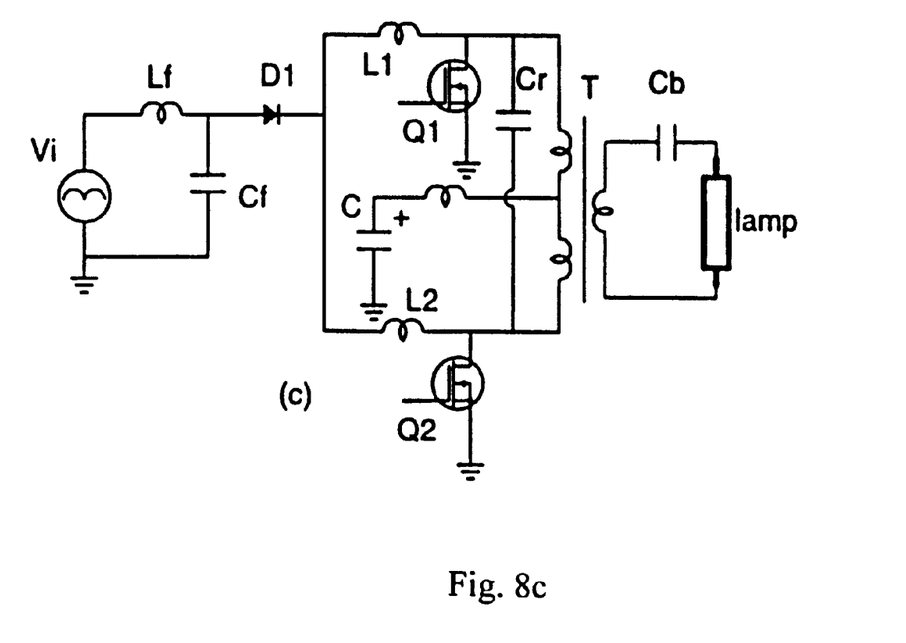

A current-fed pushpull converter can be derived by paralleling two class-E converters and driving them out of phase. Based on this, another new circuit is derived by paralleling two converters of the topology shown in FIG. 8b but with a different matching network as shown in FIG. 8c, where the input part resembles an interleaved nonideal DICM boost current shaper and its output part resembles a current-fed pushpull converter comprising switches Q1 and Q2 driving in a pushpull fashion from both ends of a center tapped primary winding of a transformer T. The ends of the primary winding are coupled together by a resonant capacitor Cr while the center tap is connected by inductor L and capacitor C to the return current path for the switches Q1 and Q2 to the voltage source $V_i$ (i.e., to circuit ground). The lamp load is coupled by a series dc blocking capacitor Cb across the secondary winding.

Figure 8D:
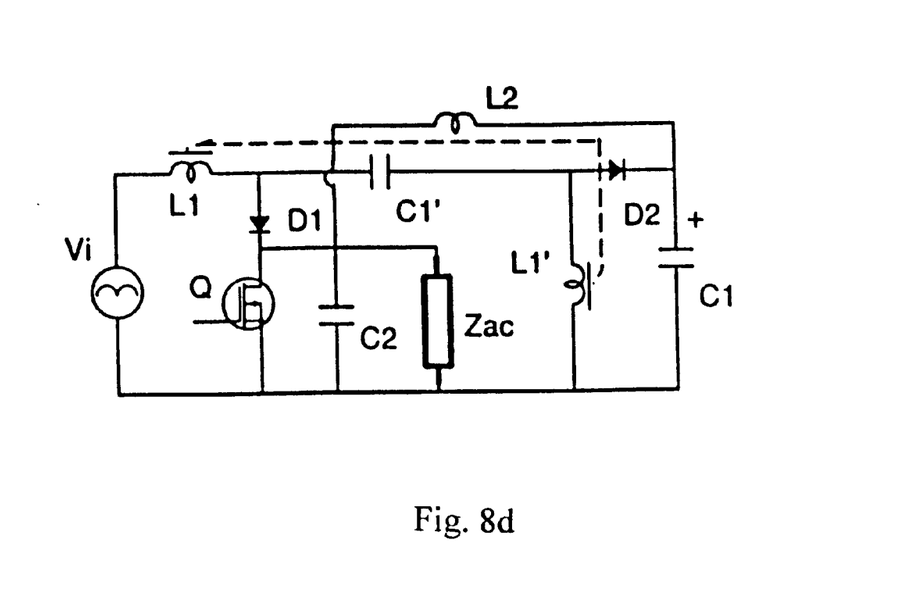
Figure 8E:
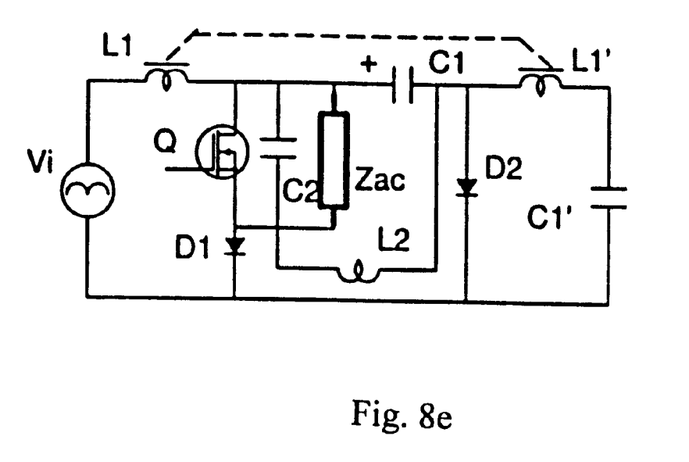
Figure 8F:
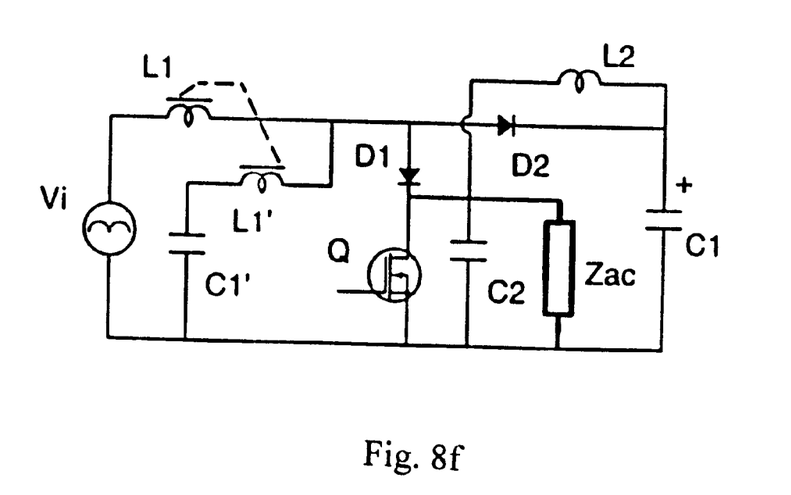
Figure 8G:
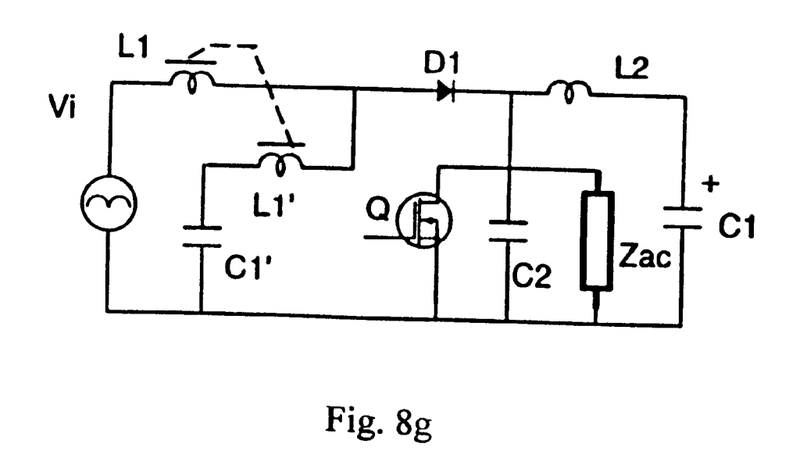
Figure 8H:
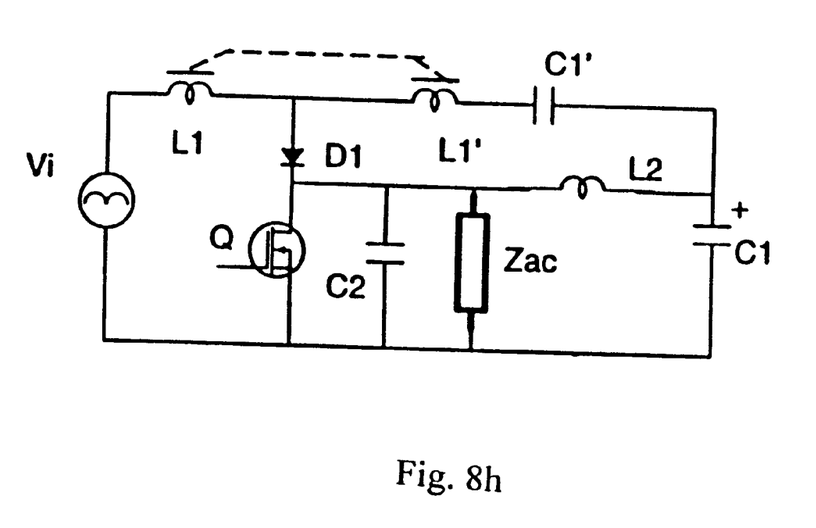

Combinations of coupled-inductor automatic current shapers in the input part with a class-E converter in the output part result in further embodiments shown in FIGS. 8d, e, f, g and h. In these embodiments, the input inductor L1 is coupled with another inductor L1' to steer any ripple current out of the input inductor L1 into the other inductor L1' in accordance with the teachings of U.S. Pat. No. 4,184,197. Because of this steering of ripple current away from the input inductor L1, less filtering is required of the input current from the rectified voltage source $V_i$. Consequently, the LC lowpass filter at the input of the converter may be omitted. For that reason, such a filter is not shown in FIGS. 8d through 8h, although one may be included if desired or required. It should also be noted that in FIGS. 8d through 8h, the LCC resonant network at the output is schematically included with the load Zac to simplify the schematic circuit. In each case, the input part of the converter has the same number of reactive components as circuits which resemble coupled-inductor versions of the SEPIC, Ćuk, boost and two nonideal boost converters, respectively. Note that the nonideal boost circuit in FIG. 8g can be derived by simply disconnecting diode D2 in the circuit of FIG. 8d or FIG. 8f. The two inductors are coupled such that switching ripple on the input inductor L1 is zero and slight or no input filtering is needed. Also note that the embodiment of FIG. 8h is but a variant of the circuit of FIG. 8g. It should also be noted that isolated load versions of all of these converters, except the circuit of FIG. 8c which already has an isolation transformer, can be provided by simply inserting a transformer in the resonant matching networks as disclosed by the present inventors in their U.S. Pat. No. 5,416,387, namely between the series capacitor Cs and the inductor L or between the inductor L and the capacitor Cp, or even between the capacitor Cp and the lamp or as is shown for the embodiment of FIG. 8c.

Advantages of a class-E converter include single-switch configuration and lossless switching. But the switch has to take about π times the dc input voltage, which for off-line applications, such as in the case of the lamp ballast, may be a serious problem. Other single-switch configurations which impose relatively lower voltage stress on the switching device are also applicable for a lamp ballast in the event that pursuit of a lower rating switch is more important than achieving lossless switching.

Operation

It has been shown that the new converter topology can be derived by properly combining the automatic current shaper and the single-switch converter. The operation of the combined converter is, nevertheless, not that of a simple cascade of two functionally different parts. For example, the automatic shaper is mainly operated with squarewave voltage while the class-E converter is switched with resonant (half sinewave) voltage. When the two circuits are combined, new operating modes appear owing to the interactions between them.

As a typical example, operation of the circuit in FIG. 8a is described with its major waveforms both during a single switching period and in a line period. It will be shown that when the buckboost automatic current shaper and the class-E converter are combined, certain interactions occur between them. As a result, the input part of the combined circuit merely resembles but no longer functions exactly like its parent converter; neither does its output part.

Figure 9:
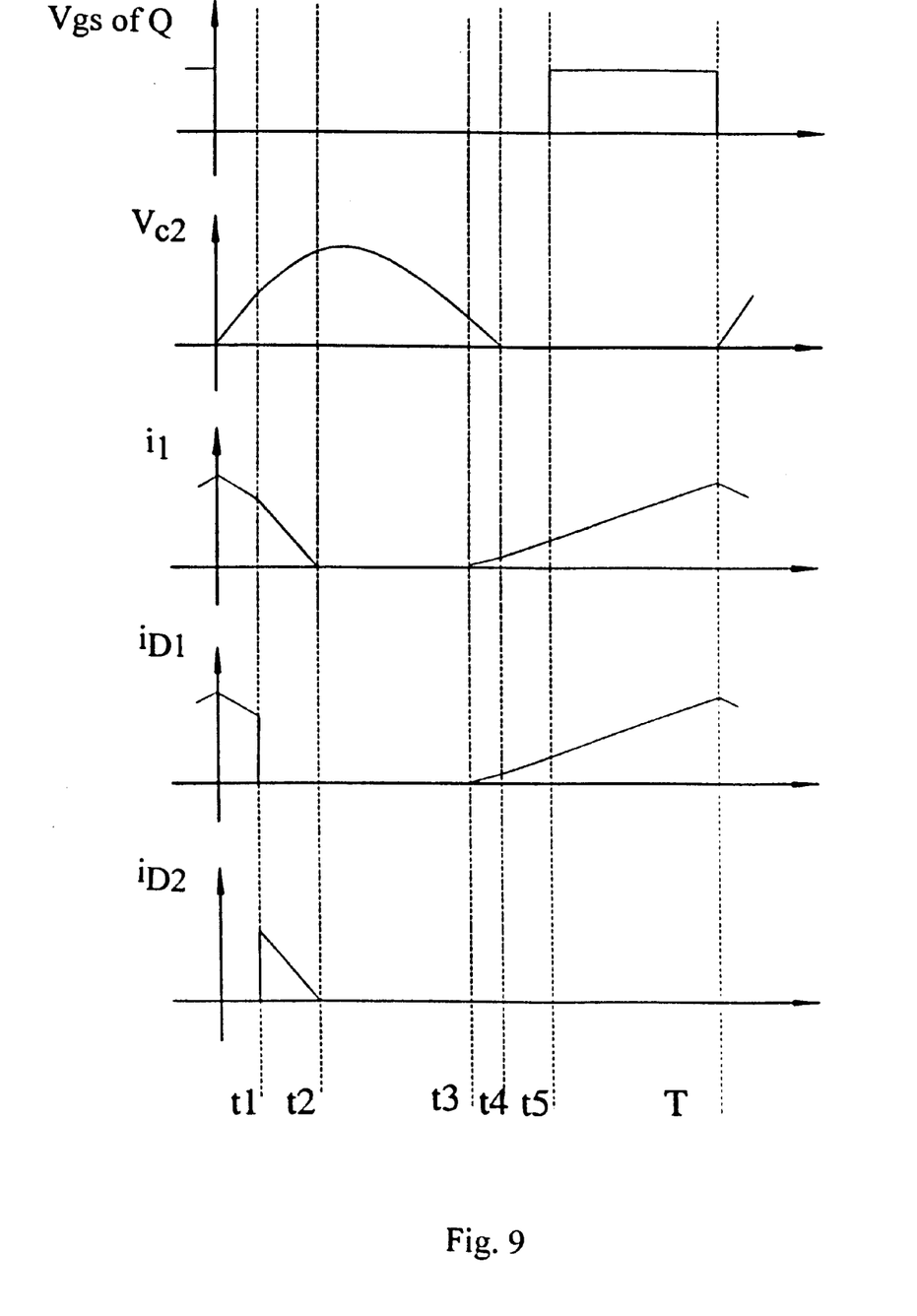
FIG. 9 illustrates waveforms in the circuit of FIG. 8a during six switching intervals.

Several operating modes exist in the proposed circuit where the desirable mode occurs when the input inductor L1 is less than its critical value so that ii is discontinuous and input part of the circuit resembles the automatic current shaper. Only the preferred mode of operation is described here. Complete operation of the circuit in FIG. 8a comprises six switching intervals during one switching period as shown in FIG. 9. The cycle starts when the active switch Q turns OFF at time t0. The resonant capacitor C2 is charged by resonant current io and input inductor current $i_l$. The voltage vc2 increases almost linearly to $V_{c1}+\sqrt{2}|V_i|$ and the diode D2 closes and D1 opens at the time t1. Now the energy storage capacitor C1 is placed across the input inductor L1, its current $i_l$ decreases linearly to zero due to the DICM operation and diode D2 reopens at time t2. Meanwhile, switch voltage vc2 changes in the resonant way. When vc2 drops below the input voltage $|V_i|$ at time t3, diode D1 turns ON again and inductor current $i_l$ starts to flow. After the vc2 drops to zero at time t4, the full line voltage is applied to the input inductor L1 and its current $i_l$ increases linearly. Thus, the active switch Q can again be turned ON at t5 when voltage across it is zero. The next cycle starts when the switch Q turns OFF at time t0.

Several things make the combined circuit operation different from merely the sum of its separate circuit operations due to the interactions between the input and output parts. First, the input voltage $|V_i|$ is a rectified sinewave $V_i \sin\omega_l t$. When $|V_i|$ is low, the peak value of i1 is also low so that $i_l$ can be discharged to zero even before vc2 rises to vc1+vi. Hence the switching intervals 0-t1-t2 do not even exist when $|V_i|$ is low. In that case, the two intervals are reduced to one interval that ends when the $i_l$ is discharged to zero and D1 turns OFF. The above variation of operation during a line period causes a certain amount of line ripple on top of the voltage vc2 and on the converter output. Second, the charging of the resonant capacitance C2 after Q turns OFF consumes part of the input inductor current $i_l$ when |vi| is high and all the current when $|V_i|$ is low which should otherwise charge capacitor C1 in the event of buckboost converter. Third, the existence of the diode D1 switching interval t3–t4 makes the input inductor current $i_l$ start to rise at different times which makes the effective duty ratio variant and larger than it is desired. In addition, the early rise of $i_l$ (especially when $|V_i|$ is high) delays vc2's drop-back to zero so that the time t4 is also variant resulting in a reduced lossless switching region. The above interactions make the input current shaping part of the circuit unique from its parent current shaper. True, the output part of the circuit is degraded owing to the superimposed line ripple and reduced lossless switching region, but the desirable DICM operation of L1 will keep the effect of the above interactions to a minimum since during the t3-t4 interval current $i_l$ is still close to zero.

Figure 10A:
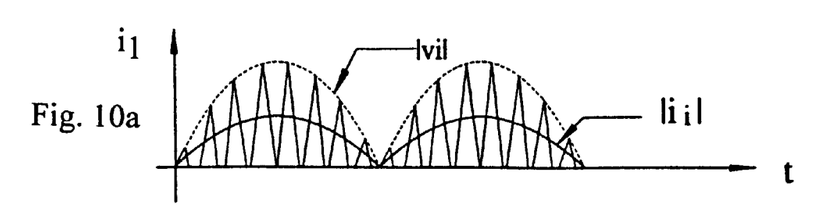
FIGS. 10a through 10e illustrate major waveforms of the circuit in FIG. 8a during one switching period.
Figure 10B:
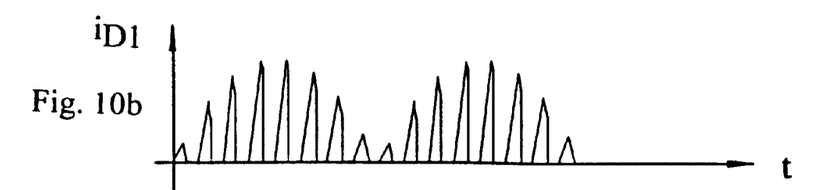
Figure 10C:
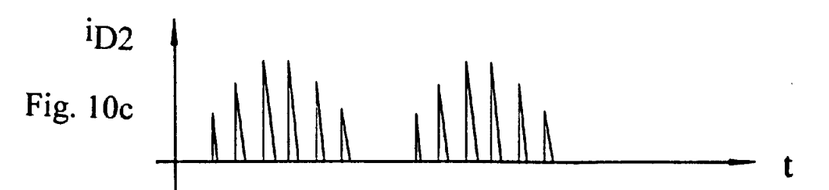
Figure 10D:
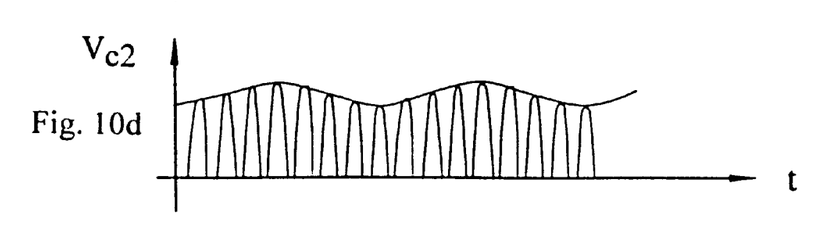
Figure 10E:
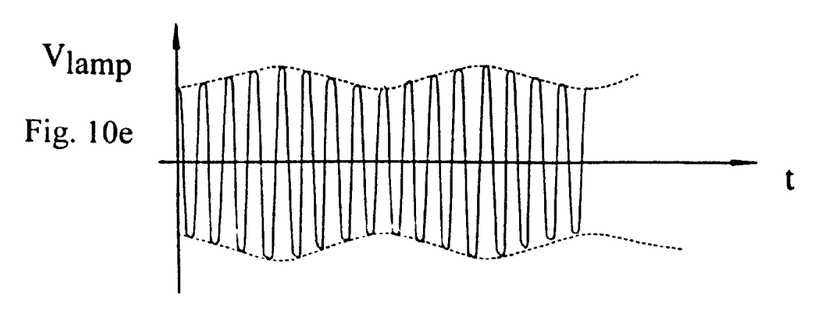

Major waveforms are shown in FIGS. 10a through e to further illustrate the circuit operation. The inductor current il in DICM operation is modulated by the rectified input voltage $|V_i|$ as shown in FIG. 10a. As demonstrated in FIG. 9, when $|V_i|$ is high, il is equal to the iD1 during the interval t3-t4-t5-T0-t1 and is equal to the iD2 during the interval t1-t2 which is shown in FIGS. 10b and 10c. When line voltage $|V_i|$ is cycled to a lower value, the interval t0–t2 does not exist and iD1 is equal to il while iD2 remains zero. From the perspective of line scale, input part of the circuit tends to be a buckboost automatic current shaper when line voltage $|V_i|$ is close to its peak and resembles a boost automatic current shaper when line voltage $|V_i|$ is close to zero. Qualitatively, the operation of the input part of the circuit is somewhere between a buckboost and a boost automatic current shaping circuit. Since the peak value of iD1 is modulated by the input voltage $|V_i|$, the input current ii (which is the average of current iD1) closely follows the input voltage $|V_i|$. The resonant voltage vce also carries a small amount of line ripple due to the above interactions as shown in FIG. 10d which is passed on to the lamp current waveform as shown in FIG. 10e.

Although particular embodiments of the invention have been described and illustrated herein, it is recognized that modifications may readily occur to those skilled in the art. Consequently, it is intended that the claims be interpreted to cover such modifications and equivalents thereof.

We claim:

1. A high power factor ac-to-ac converter for converting low frequency ac power line voltage to high frequency voltage for a high frequency ac load, said ac-to-ac converter comprising first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier and a lowpass LC filter for providing rectified sinewave voltage from said ac power line voltage, a first fast recovery diode and input inductor connected in series with said single switch to a return current path for said lowpass LC filter, an energy storage and transfer capacitor and a second fast recovery diode in series, and in that order, connected in parallel across said input inductor from said single active switch to said first fast recovery diode, a second inductor connected in parallel across said energy storage and transfer capacitor and said single active switch and a capacitor connected in parallel across said single active switch.

2. A high power factor ac-to-ac converter as defined in claim 1 wherein said high frequency load is a gas discharge lamp.

3. A high power factor ac-to-ac converter for converting low frequency ac power line voltage to high frequency voltage for a high frequency ac load, said ac-to-ac converter comprising first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier and a lowpass LC filter for providing rectified sinewave voltage from said ac power line voltage, a fast recovery diode and input inductor connected in series with said single switch to a return current path for said lowpass LC filter through an energy storage and transfer capacitor and an inductor connected in parallel across said single active switch, and a second capacitor connected in parallel across said single active switch.

4. A high power factor ac-to-ac converter as defined in claim 3 wherein said high frequency load is a gas discharge lamp.

5. A high power factor ac-to-ac converter for converting low frequency ac power line voltage to high frequency voltage for a high frequency ac load with a resonant matching network, wherein said ac-to-ac converter comprises first and second overlapping parts, said first part comprises an input network means and dual active switches operated out of phase at a high constant frequency and a constant duty ratio for automatic sinewave current shaping by rectification of sinewave input voltage and yielding rectified sinewave current for conversion to high frequency pulsed, half sinewave voltage in said second part, and said second part comprises said dual active switches and an output network means for operating on said sinewave current from said first part to convert it to high frequency pulsed, half sinewave voltage and a resonant matching network means for coupling said pulsed, half sinewave voltage to said high frequency load and converting said pulsed voltage to the high frequency ac voltage for driving said ac load, wherein said input network means of said first part comprises a bridge rectifier and an LC filter for providing rectified sinewave voltage, a fast recovery diode connected in series to each of two input inductors operating in a discontinuance conduction mode, each inductor being connected in series to a return current path for said LC filter through a separate one of said dual switches, a transformer having a center tapped primary winding and a secondary winding, said primary winding being connected between separate junctions of said two input inductors and said dual switches, an energy storage capacitor and a choke inductor connected in series between the center tap of said primary winding and said return current path, a resonant capacitor connected in parallel across said center tapped primary winding, and a capacitor connected in series with said high frequency ac load across said secondary winding.

6. A high power factor ac-to-ac converter as defined in claim 5 wherein said high frequency ac load is a gas discharge lamp.

7. A high power factor ac-to-ac converter for converting low frequency ac power line voltage to high frequency voltage for a high frequency ac load with a resonant matching network, wherein said ac-to-ac converter comprises first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier for providing rectified sinewave voltage from said ac power line voltage, a fast recovery diode and first inductor connected in series with said single active switch to a return current path for said bridge rectifier, a first capacitor and said ac load both being connected in parallel with said single active switch, a second capacitor and second fast recovery diode connected in series with an energy storage capacitor to said return current path, a second inductor connecting a junction between said energy storage capacitor and said second fast recovery diode to a junction between said first fast recovery diode and said single active switch, and a third inductor having one terminal connected to a junction between said second capacitor and a second terminal connected to said return current path, and magnetic means coupling said third inductor to said first inductor for steering switching ripple current from said first inductor to said third inductor.

8. A high power factor ac-to-ac converter for converting low frequency ac power line voltage to high frequency voltage for a high frequency ac load with a resonant matching network, wherein said ac-to-ac converter comprises first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier for providing rectified sinewave voltage from said ac power line voltage, a first inductor and a fast recovery diode connected in series with said single active switch to a return current path for said bridge rectifier, an energy storage capacitor and a second inductor connected in series through a second capacitor to said return current path, a second fast recovery diode connecting a first junction between said second inductor and said energy storage capacitor to said return current path, a third capacitor and said ac load both being connected in parallel across said single active switch, and a third inductor having a first terminal connected to said first junction, and a second terminal connected to a second junction between said single active switch and said first fast diode, and magnetic means coupling said first inductor and said second inductor for steering ripple current out from said first inductor to said second inductor.

9. A high power factor ac-to-ac converter for converting low frequency ac power line voltage to high frequency voltage for a high frequency ac load with a resonant matching network, wherein said ac-to-ac converter comprises first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier for providing rectified sinewave voltage from said ac power line voltage, a first inductor and a first fast recovery diode connected in series with said single active switch to a return current path for said bridge rectifier, said ac load being connected in parallel across said single active switch, a second fast recovery diode and an energy storage capacitor connected in series with said first inductor from said bridge rectifier to said return current path for said bridge rectifier, a second capacitor connected in parallel with said single active switch, a third inductor coupling a junction between said first fast recovery diode and said single active switch to a junction between said second fast recovery diode and said energy storage capacitor, and magnetic means coupling said first inductor to a second inductor for steering switching ripple current out from said first inductor to said second inductor.

10. A high power factor ac-to-ac converter for converting low frequency ac power line voltage to high frequency voltage for a high frequency ac load with a resonant matching network, wherein said ac-to-ac converter comprises first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier for providing rectified sinewave voltage from said ac power line voltage, a first inductor and a first fast recovery diode connected in series with said single active switch to a return current path for said bridge rectifier, a second inductor and a first capacitor connected in parallel across said first fast recovery diode and said single active switch, said ac load being connected in parallel across said single active switch, a second capacitor connected in parallel across said single active switch, a third inductor and an energy storage capacitor in series connected across said single active switch, and magnetic means coupling said first inductor to said second inductor for steering switching ripple current out from said first inductor to said second inductor.

11. A high power factor ac-to-ac converter for converting low frequency ac power line voltage to high frequency voltage for a high frequency ac load with a resonant matching network, wherein said ac-to-ac converter comprises first and second overlapping parts, said first part comprising an input network means and a single active switch operated at a high constant frequency and a constant duty ratio for automatic sinewave current shaping by rectification of input sinewave voltage and yielding rectified sinewave current for conversion to high frequency pulsed, half sinewave voltage in said second part, and said second part comprising said single active switch and an output network means for operating on said rectified sinewave current from said first part to convert it to high frequency pulsed, half sinewave voltage and a resonant matching network means for coupling said high frequency pulsed, half sinewave voltage to said high frequency ac load and converting said pulsed voltage to high frequency ac voltage for driving said ac load, wherein said input network of said first part comprises a bridge rectifier for providing rectified sinewave voltage from said ac power line voltage, a first inductor and a fast recovery diode connected in series with said single active switch to a return current path for said bridge rectifier, a capacitor and said ac load connected in parallel across said single active switch, a second inductor and second capacitor connected in series from a junction between said first inductor and said fast recovery diode to said return current path through an energy storage capacitor, and a third inductor coupling a junction between said second capacitor and said energy storage capacitor to a junction between said fast recovery diode and said single active switch, and magnetic means coupling said first inductor to said second inductor for steering switching ripple current from said first inductor to said second inductor.

\* \* \* \* \*